United States Patent
Perkins et al.

(10) Patent No.: US 12,522,843 B2
(45) Date of Patent: Jan. 13, 2026

(54) COMPOSITIONS AND METHODS OF CHROMOSOMAL SILENCING

(71) Applicant: CarryGenes Bioengineering, LLC, Savannah, GA (US)

(72) Inventors: Edward Perkins, Savannah, GA (US); Amy Greene, Savannah, GA (US); Dominique Broccoli, Savannah, GA (US)

(73) Assignee: CarryGenes Bioengineering, LLC, Savannah, GA (US)

( * ) Notice: Subject to any disclaimer, the term of this patent is extended or adjusted under 35 U.S.C. 154(b) by 1576 days.

(21) Appl. No.: 16/494,252

(22) PCT Filed: Mar. 12, 2018

(86) PCT No.: PCT/US2018/022075
§ 371 (c)(1),
(2) Date: Sep. 13, 2019

(87) PCT Pub. No.: WO2018/169892
PCT Pub. Date: Sep. 20, 2018

(65) Prior Publication Data
US 2020/0131530 A1    Apr. 30, 2020

Related U.S. Application Data (60) Provisional application No. 62/471,793, filed on Mar. 15, 2017.

(51) Int. Cl.
| | | |
|---|---|---|
| C12N 15/85 | (2006.01) | |
| A61K 48/00 | (2006.01) | |
| C12N 9/10 | (2006.01) | |
| C12N 15/90 | (2006.01) | |

(52) U.S. Cl.
CPC ............ *C12N 15/85* (2013.01); *A61K 48/005* (2013.01); *C12N 9/1029* (2013.01); *C12N 15/907* (2013.01); *C12N 2800/208* (2013.01); *C12N 2800/30* (2013.01)

(58) Field of Classification Search
CPC .................................................. C12N 15/85
See application file for complete search history.

(56) References Cited

U.S. PATENT DOCUMENTS

| | | | |
|---|---|---|---|
| 2002/0160410 A1 | 10/2002 | Hadlaczky et al. | |
| 2004/0096891 A1 | 5/2004 | Bennett | |
| 2004/0143861 A1* | 7/2004 | Hadlaczky ......... | A01K 67/0275 800/19 |
| 2005/0181506 A1 | 8/2005 | Perkins et al. | |
| 2007/0004002 A1 | 1/2007 | Okazaki | |
| 2011/0318832 A1 | 12/2011 | Cech et al. | |
| 2012/0064578 A1 | 3/2012 | Perkins et al. | |
| 2012/0093785 A1 | 4/2012 | Oshimura et al. | |
| 2014/0294785 A1* | 10/2014 | Lawrence ................. | C12N 9/12 435/441 |
| 2014/0295501 A1* | 10/2014 | Katona ................... | C12N 15/85 435/320.1 |
| 2018/0010150 A1 | 1/2018 | Perkins et al. | |

FOREIGN PATENT DOCUMENTS

| | | |
|---|---|---|
| EP | 2218786 A4 | 6/2011 |
| EP | 2522725 B1 | 10/2016 |
| EP | 1559782 B1 | 12/2016 |
| WO | 9740183 A2 | 10/1997 |
| WO | 0018941 A1 | 4/2000 |
| WO | 02096923 B1 | 5/2004 |

OTHER PUBLICATIONS

Heard et al., "Xist yeast artificial chromosome transgenes function as X-inactivation centers only in multicopy arrays and not as single copies". Mol Cell Biol. Apr. 1999; 19(4):3156-66 (Year: 1999).*
Bacher et al., "Transient colocalization of X-inactivation centres accompanies the initiation of X inactivation". Nat Cell Biol 8, 293-299 (2006). (Year: 2006).*
Ikeno et al. "Construction of YAC-based mammalian artificial chromosomes. Nat Biotechnol". May 1998; 16(5):431-9. (Year: 1998).*
Brenda Grimes and Zoia Monaco, "Artificial and Engineered Chromosomes: Developments and Prospects for Gene Therapy," Chromosoma, (2005), 114:230-241.
Bruce Bunnell, et al., "Development of Mammalian Artificial Chromosomes for the Treatment of Genetic Diseases: Sandhoff and Krabbe Diseases," Expert Opin. Biol. Therapy (2005) 5(2):95-206.
Tomohiro Tsuduki, et al., "An Artificially Constructed De Novo Human Chromosome Behaves Almost Identically to Its Natural Counterpart during Metaphase and Anaphase in Living Cells," Molecular and Cellular Biology (2006), vol. 26, No. 20, p. 7682-7695.
Yueju Wang, et al., "Recombinase Technology: Applications and Possibilities," Plant Cell Rep., (2011), 30:267-285.
Bacher, CP et al., "Transient colocalization of X-inactivation centres accompanies the initiation of X inactivation", Nature Cell Biology, (2006), vol. 8, No. 3, pp. 293-299, XP055555839 [X] 16-20, 27.
Bao-Cutrona, M et al., "Unexpected Expression Pattern of Tetracycline-Regulated Transgenes in Mice", Genetics, (2009). vol. 181, No. 4, pp. 1687-1691, XP055555843.
Basu, J., "Artificial and Engineered Chromosomes: Non-Integrating Vectors for Gene Therapy." Trends in Molecular Medicine, Elsevier Current Trends, vol. 11 (5), pp. 251-258 (2005).
Heard, E et al., "Xist Yeast Artificial Chromosome Transgenes Function as X-Inactivation Centers Only in Multicopy Arrays and Not as Single Copies", Molecular and Cellular Biology, (1999), vol. 19, No. 4, pp. 3156-3166, XP055555837.
Ikeno, M et al., "Construction of YAC-based mammalian artificial chromosomes", Nature Biotechnology, (19980500), vol. 16, No. 5, pp. 431-439, XP009060040.

(Continued)

*Primary Examiner* — Allison M Fox
*Assistant Examiner* — Hanan Isam Abuzeineh
(74) *Attorney, Agent, or Firm* — Susan Myers Fitch (57) ABSTRACT

The present invention encompasses compositions and methods to create a whole chromosome regulatable "kill" switch to inactivate expression of one or more therapeutic genes expressed from a synthetic chromosome.

11 Claims, 2 Drawing Sheets

(56) References Cited

OTHER PUBLICATIONS

International Search Report issued on May 16, 2018 in PCT/US18/22075.
Katoh, et al., (2004) "Construction of a novel human artificial chromosome vector for gene delivery." Biochem. Biophys. Res. Comm. 321:280-290.
Kazuki, et al., "Refined human artificial chromosome vectors for gene therapy and animal transgenesis." Gene Therapy, vol. 18(4):384-393 (2010).
Kazuki, Y et al., "Human Artificial Chromosomes for Gene Delivery and the Development of Animal Models". Molecular Therapy, (2011) 19(9):1591-1601. doi:10.1038/mt.2011.136, XP055581607.
Kouprina et al., (2013) "A new generation of human artificial chromosomes for functional genomics and gene therapy", Cell Mol Life Sci., vol. 70, No. 7, pp. 1135-1148, XP055470579.
Kouprina, et al., (2014) "Human Artificial Chromosome-Based Gene Delivery Vectors for Biomedicine and Biotechnology." Expert Opinion on Drug Delivery. 11(4):517-535.
Kurosaki, et al., "Integration-free and stable expression of FVIII using a human artificial chromosome." Journal of Human Genetics, vol. 56 (10), pp. 727-733 (2011).
Lindenbaum et al., "A mammalian artificial chromosome engineering system (ACE System) applicable to biopharmaceutical protein production, transgenesis and gene -based cell therapy," Nucleic Acids Research, (2004), vol. 32, No. 21, pp. 1-15 (p. e172, XP002741726).
Luikenhuis, S et al., "Antisense Transcription through the Xist Locus Mediates Tsix Function in Embryonic Stem Cells", Molecular and Cellular Biology, (2001), vol. 21, No. 24, pp. 8512-8520, XP055555841.
Martella, et al., "Mammalian Synthetic Biology: Time for Big MACs." ACS Synthetic Biology, vol. 5 (10), pp. 1040-1049 (2016).
Ren, X et al., "A Novel Human Artificial Chromosome Vector Provides Effective Cell Lineage- Specific Transgene Expression in Human Mesenchymal Stem Cells", Stem Cells, (Nov. 1, 2005), vol. 23, No. 10, doi: 10.1634/stemcells.2005-0021, pp. 1608-1616, XP055473399.
Rocchi, et al., (2010) "*Escherichia coli*-Cloned CTFR Loci Relevant for Human Artificial Chromosome Therapy." Human Gene Therapy, 21:1077-1092.
Shitara, et al., 2008, "Telomerase-mediated life-span extension of human primary fibroblasts by human artificial chromosome (HAC) vector." Biochem. Biophys. Res. Commun. 369(3):807-11.
Suzuki, et al., (2014), "A Novel System for Simultaneous or Sequential Integration of Multiple Gene-Loading Vectors into a Defined Site of a Human Artificial Chromosome." Plos One. 9(10), pp. 1-9 (2014).
Takiguchi, et al., "A Novel and Stable Mouse Artificial Chromosome Vector." ACS Synthetic Biology, vol. 3 (12), pp. 903-914 (2014).
Toth, et al., "Novel Method to Load Multiple Genes onto a Mammalian Artificial Chromosome." Plos One, Public Library of Science, US, vol. 9 (1), pp. e85565-1 (2014).
Vanderbyl, S et al., "Transfer and Stable Transgene Expression of a Mammalian Artificial Chromosome into Bone Marrow-Derived Human Mesenchymal Stem Cells", Stem Cells, (20040500), vol. 22, No. 3, doi:doi:10.1634/stemcells.22-3-324, pp. 324-333, XP002506658.
Yamaguchi, et al., 2011 "A Method for Producing Transgenic Cells Using a Multi-Integrase System on a Human Artificial Chromosome Vector." Plos One 6(2): e17267. https://doi.org/10.1371/journal.pone.0017267.

* cited by examiner

COMPOSITIONS AND METHODS OF CHROMOSOMAL SILENCING

CROSS-REFERENCE TO RELATED APPLICATIONS

The present application is a USC § 371 National Stage filing entitled to the benefit of the filing date of International PCT Patent Application No. PCT/US18/22075 filed Mar. 12, 2018; which itself is entitled to the benefit of the filing date under 35 USC § 119 (e) of U.S. Provisional Patent Application No. 62/471,793, filed Mar. 15, 2017. The contents of each of these Patents and Patent Applications are incorporated herein in their entireties by reference thereto.

STATEMENT REGARDING GOVERNMENT SUPPORT

This invention was made with the support of the United States Government under contract D15PC00008 awarded by DARPA. The U.S. Government has certain rights in this invention.

FIELD OF THE INVENTION

The field of the invention encompasses compositions and methods to create a whole chromosome regulatable ("kill") switch to inactivate expression of one or more therapeutic genes expressed from a synthetic chromosome.

BACKGROUND OF THE INVENTION

In the following discussion certain articles and methods will be described for background and introductory purposes. Nothing contained herein is to be construed as an "admission" of prior art. Applicant expressly reserves the right to demonstrate, where appropriate, that the articles and methods referenced herein do not constitute prior art under the applicable statutory provisions.

Synthetic chromosomes provide a means to introduce large payloads of genetic information into mammalian target cells as an autonomously-replicating, non-integrating chromosome-based vector system. To date, a platform mammalian synthetic chromosome has been described that comprises approximately 75 site-specific, recombination acceptor sites that can carry single or multiple copies of genes of interest delivered to the synthetic chromosome using specially-designed targeting vectors. To ensure expression of the various genes loaded onto the mammalian synthetic chromosome, one can utilize endogenous promoters or constitutive promoters; however, if one wishes to be able to control expression of the various genes, one may choose to employ regulatable (inducible/repressible) promoters. Alternatively, it may be of interest to employ endogenous or constitutive promoters for the various genes and also have the flexibility to silence expression of all the genes on the entire mammalian synthetic chromosome. The present invention provides methods and compositions that address this need.

SUMMARY OF THE INVENTION

This Summary is provided to introduce a selection of concepts in a simplified form that are further described below in the Detailed Description. This Summary is not intended to identify key or essential features of the claimed subject matter, nor is it intended to be used to limit the scope of the claimed subject matter. Other features, details, utilities, and advantages of the claimed subject matter will be apparent from the following written Detailed Description, including those aspects illustrated in the accompanying drawings and defined in the appended claims.

The present invention provides synthetic chromosomes comprising a whole-chromosome inactivating switch comprising an X chromosome inactivation center (Xic) taken from an X chromosome, or, alternatively, a whole-chromosome inactivating switch comprising specific gene sequences from the Xic, including Xist with or without Tsix.

Thus, in certain embodiments, the present disclosure provides a method for silencing genes expressed from a synthetic chromosome comprising the steps of: providing mammalian target cells; transfecting the mammalian target cells with a synthetic chromosome comprising at least one stably-integrated expression cassette expressing gene products from Xic; and expressing the gene products from Xic, wherein the synthetic chromosome is inactivated and expression of the gene products expressed from the synthetic chromosome are silenced. In some aspects of this embodiment, an entire Xic locus is stably integrated onto the synthetic chromosome, whereas in other aspects, only select sequences from the Xic locus such has Xist has been stably integrated onto the synthetic chromosome. In some aspects, in addition to Xist, Tsix has been stably integrated onto the synthetic chromosome.

In some embodiments of the methods, the synthetic chromosome comprises mammalian centromere sequences, and in some aspects of this embodiment, the synthetic chromosome comprises human centromere sequences.

In some embodiments of the invention, the Xist gene product from Xic is under control of a regulatable (inducible/repressible) promoter, and in some aspects of this embodiment, the inducible promoter is induced by the presence of tetracycline or a derivative thereof. In some instances, the inducible promoter is inactive in the presence of tetracycline or a derivative thereof. In other embodiments, the Tsix gene product from Xic is under control of an inducible promoter, and in some aspects of this embodiment, the inducible promoter is induced by the presence of tetracycline or a derivative thereof. In some instances, the inducible promoter is inactive in the presence of tetracycline or a derivative thereof. In some embodiments, the promoter is repressible. In some embodiments, a regulatory RNA (e.g., an inhibitory RNA) may be produced by induction of the promoter. In some embodiments, a regulatory RNA may be used to regulate an endogenous gene product, or a promoter or a transcript produced by the synthetic chromosome.

In some embodiments, the mammalian target cells are human cells, and the synthetic chromosome comprises human centromere sequences. In some aspects, the mammalian target cells are human mesenchymal stem cells.

In some embodiments of the methods, Xic is delivered to the synthetic chromosome via λINTR integrase mediated targeting (attP x attB recombination).

Other embodiments include a synthetic chromosome comprising a whole chromosome regulatable ("kill") switch. In some embodiments, the synthetic chromosome comprises an entire Xic region from an X chromosome, and in other embodiments, the synthetic chromosome comprises select sequences from the Xic region of the X chromosome, including the Xist locus, and in some embodiments, further comprising a Tsix locus.

In embodiments, the synthetic chromosome further comprises at least one gene of interest, ten genes of interest, twenty genes of interest, or 25 or more genes of interest.

In some embodiments, the synthetic chromosome comprises mammalian centromere sequences, and in aspects of these embodiments, the synthetic chromosome comprises human centromere sequences.

Other embodiments include a human cell comprising a synthetic chromosome comprising a whole chromosome regulatable ("kill") switch.

Additional embodiments provide a method for regulating (e.g., silencing) genes expressed from a synthetic chromosome comprising: providing mammalian target cells; transfecting the mammalian target cells with a synthetic chromosome comprising at least one stably-integrated expression cassette expressing gene products from Xic; expressing the gene products from Xic; and inactivating the synthetic chromosome where expression of the gene products expressed from the synthetic chromosome are silenced. These and other aspects and uses of the invention will be described in the detailed description.

DETAILED DESCRIPTION OF THE INVENTION

The methods described herein may employ, unless otherwise indicated, conventional techniques and descriptions of molecular biology (including recombinant techniques), cell biology, biochemistry, and cellular engineering technology, all of which are within the skill of those who practice in the art. Such conventional techniques include oligonucleotide synthesis, hybridization and ligation of oligonucleotides, transformation and transduction of cells, engineering of recombination systems, creation of transgenic animals and plants, and human gene therapy. Specific illustrations of suitable techniques can be had by reference to the examples herein. However, equivalent conventional procedures can, of course, also be used. Such conventional techniques and descriptions can be found in standard laboratory manuals such as *Genome Analysis: A Laboratory Manual Series* (Vols. I-IV) (Green, et al., eds., 1999); *Genetic Variation: A Laboratory Manual* (Weiner, et al., eds., 2007); Sambrook and Russell, *Condensed Protocols from Molecular Cloning: A Laboratory Manual* (2006); and Sambrook and Russell, *Molecular Cloning: A Laboratory Manual* (2002) (all from Cold Spring Harbor Laboratory Press); *Protein Methods* (Bollag et al., John Wiley & Sons 1996); *Nonviral Vectors for Gene Therapy* (Wagner et al. eds., Academic Press 1999); *Viral Vectors* (Kaplift & Loewy, eds., Academic Press 1995); *Immunology Methods Manual* (Lefkovits ed., Academic Press 1997); *Gene Therapy Techniques, Applications and Regulations From Laboratory to Clinic* (Meager, ed., John Wiley & Sons 1999); M. Giacca, *Gene Therapy* (Springer 2010); *Gene Therapy Protocols* (LeDoux, ed., Springer 2008); *Cell and Tissue Culture: Laboratory Procedures in Biotechnology* (Doyle & Griffiths, eds., John Wiley & Sons 1998); *Mammalian Chromosome Engineering—Methods and Protocols* (G. Hadlaczky, ed., Humana Press 2011); *Essential Stem Cell Methods,* (Lanza and Klimanskaya, eds., Academic Press 2011); *Stem Cell Therapies: Opportunities for Ensuring the Quality and Safety of Clinical Offerings: Summary of a Joint Workshop* (Board on Health Sciences Policy, National Academies Press 2014); *Essentials of Stem Cell Biology,* Third Ed., (Lanza and Atala, eds., Academic Press 2013); and *Handbook of Stem Cells,* (Atala and Lanza, eds., Academic Press 2012), all of which are herein incorporated by reference in their entirety for all purposes. Before the present compositions, research tools and methods are described, it is to be understood that this invention is not limited to the specific methods, compositions, targets and uses described, as such may, of course, vary. It is also to be understood that the terminology used herein is for the purpose of describing particular aspects only and is not intended to limit the scope of the present invention, which will be limited only by the appended claims.

Note that as used in the present specification and in the appended claims, the singular forms "a," "and," and "the" include plural referents unless the context clearly dictates otherwise. Thus, for example, reference to "a composition" refers to one or mixtures of compositions, and reference to "an assay" includes reference to equivalent steps and methods known to those skilled in the art, and so forth.

Unless defined otherwise, all technical and scientific terms used herein have the same meaning as commonly understood by one of ordinary skill in the art to which this invention belongs. All publications mentioned herein are incorporated herein by reference for the purpose of describing and disclosing devices, formulations and methodologies which are described in the publication and which might be used in connection with the presently described invention.

Where a range of values is provided, it is understood that each intervening value between the upper and lower limit of that range and any other stated or intervening value in that stated range is encompassed within the invention. The upper and lower limits of these smaller ranges may independently be included in the smaller ranges, subject to any specifically excluded limit in the stated range. Where the stated range includes both of the limits, ranges excluding either one of those included limits are also included in the invention.

In the following description, numerous specific details are set forth to provide a more thorough understanding of the present invention. However, it will be apparent to one of ordinary skill in the art upon reading the specification that the present invention may be practiced without one or more of these specific details. In other instances, well-known features and procedures well known to those skilled in the art have not been described in order to avoid obscuring the invention.

Definitions

Unless expressly stated, the terms used herein are intended to have the plain and ordinary meaning as understood by those of ordinary skill in the art. The following definitions are intended to aid the reader in understanding the present invention, but are not intended to vary or otherwise limit the meaning of such terms unless specifically indicated.

"Binding" as used herein (e.g., with reference to an nucleic acid-binding domain of a polypeptide) refers to a non-covalent interaction between a polypeptide and a nucleic acid. While in a state of non-covalent interaction, the polypeptide and nucleic acid are said to be "associated", "interacting", or "binding". Binding interactions are generally characterized by a dissociation constant (Kd) of less than $10^{-6}$ M to less than $10^{-15}$ M. "Affinity" refers to the strength of binding, increased binding affinity being correlated with a lower Kd.

By "binding domain" it is meant a polypeptide or protein domain that is able to bind non-covalently to another molecule. A binding domain can bind to, for example, a DNA molecule (a DNA-binding protein), an RNA molecule (an RNA-binding protein) and/or a protein molecule (a protein-binding protein).

A "centromere" is any nucleic acid sequence that confers an ability of a chromosome to segregate to daughter cells through cell division. A centromere may confer stable segregation of a nucleic acid sequence, including a synthetic chromosome containing the centromere, through mitotic and meiotic divisions. A centromere does not necessarily need to be derived from the same species as the cells into which it is introduced, but preferably the centromere has the ability to promote DNA segregation in cells of that species. A "dicentric" chromosome is a chromosome that contains two centromeres. A "formerly dicentric chromosome" is a chromosome that is produced when a dicentric chromosome fragments. A "chromosome" is a nucleic acid molecule—and associated proteins—that is capable of replication and segregation in a cell upon division of the cell. Typically, a chromosome contains a centromeric region, replication origins, telomeric regions and a region of nucleic acid between the centromeric and telomeric regions. An "acrocentric chromosome" refers to a chromosome with arms of unequal length.

A "coding sequence" or a sequence that "encodes" a peptide is a nucleic acid molecule that is transcribed (in the case of DNA) and translated (in the case of mRNA) into a polypeptide in vivo when placed under the control of appropriate control sequences. The term DNA "control sequences" refers collectively to promoter sequences, polyadenylation signals, transcription termination sequences, upstream regulatory domains, origins of replication, internal ribosome entry sites, enhancers, and the like, which collectively provide for the replication, transcription and translation of a coding sequence in a recipient cell. Not all of these types of control sequences need to be present so long as a selected coding sequence is capable of being replicated, transcribed and translated in an appropriate host cell.

"Endogenous chromosomes" refer to chromosomes found in a cell prior to generation or introduction of a synthetic chromosome.

As used herein, "euchromatin" refers to chromatin that stains diffusely and that typically contains genes, and "heterochromatin" refers to chromatin that remains unusually condensed and transcriptionally inactive. Highly repetitive DNA sequences (satellite DNA) are usually located in regions of the heterochromatin surrounding the centromere.

The terms "heterologous DNA" or "foreign DNA" (or "heterologous RNA" or "foreign RNA") are used interchangeably and refer to DNA or RNA that does not occur naturally as part of the genome in which it is present, or is found in a location or locations and/or in amounts in a genome or cell that differ from that in which it occurs in nature. Examples of heterologous DNA include, but are not limited to, DNA that encodes a gene product or gene product(s) of interest. Other examples of heterologous DNA include, but are not limited to, DNA that encodes traceable marker proteins as well as regulatory DNA sequences and entire synthetic chromosomes, and the transcription products thereof.

"Operably linked" refers to an arrangement of elements where the components so described are configured so as to perform their usual function. Thus, control sequences operably linked to a coding sequence are capable of effecting the expression of the coding sequence. The control sequences need not be contiguous with the coding sequence so long as they function to direct the expression of the coding sequence. Thus, for example, intervening untranslated yet transcribed sequences can be present between a promoter sequence and the coding sequence and the promoter sequence can still be considered "operably linked" to the coding sequence. In fact, such sequences need not reside on the same contiguous DNA molecule (i.e. chromosome), and may still have interactions resulting in altered regulation.

A "promoter" or "promoter sequence" is a DNA regulatory region capable of binding RNA polymerase in a cell and initiating transcription of a polynucleotide or polypeptide coding sequence such as messenger RNA, ribosomal RNAs, small nuclear or nucleolar RNAs. functional non-coding regulatory RNAs, inhibitory RNAs (e.g., siRNAs) or any kind of RNA transcribed by any class of any RNA polymerase I, II or III. In some cases, a promoter can be bound by a molecule (DNA, RNA or polypeptide) that represses or down-regulates transcription of the coding or non-coding transcript.

"Recognition sequences" are particular sequences of nucleotides that a protein, DNA, or RNA molecule, or combinations thereof (such as, but not limited to, a restriction endonuclease, a modification methylase or a recombinase) recognizes and binds. For example, a recognition sequence for Cre recombinase is a 34 base pair sequence containing two 13 base pair inverted repeats (serving as the recombinase binding sites) flanking an 8 base pair core and designated loxP (see, e.g., Sauer, Current Opinion in Biotechnology, 5:521-527 (1994)). Other examples of recognition sequences, include, but are not limited to, attB and attP, attR and attL and others that are recognized by the recombinase enzyme bacteriophage Lambda Integrase. The recombination site designated attB is an approximately 33 base pair sequence containing two 9 base pair core-type Int binding sites and a 7 base pair overlap region; attP is an approximately 240 base pair sequence containing core-type Int binding sites and arm-type Int binding sites as well as sites for auxiliary proteins IHF, FIS, and Xis (see, e.g., Landy, Current Opinion in Biotechnology, 3:699-7071 (1993)).

A "recombinase" is an enzyme that catalyzes the exchange of DNA segments at specific recombination sites. An integrase refers to a recombinase that is usually derived from viruses or transposons, as well as perhaps ancient viruses. "Recombination proteins" include excisive proteins, integrative proteins, enzymes, co-factors and associated proteins that are involved in recombination reactions using one or more recombination sites (see, Landy, Current Opinion in Biotechnology, 3:699-707 (1993)). The recombination proteins used in the methods herein can be delivered to a cell via an expression cassette on an appropriate vector, such as a plasmid, and the like. In other embodiments, recombination proteins can be delivered to a cell in protein form in the same reaction mixture used to deliver the desired nucleic acid(s). In yet other embodiments, the recombinase could also be encoded in the cell and expressed upon demand using a tightly controlled inducible promoter.

"Ribosomal RNA" (rRNA) is the specialized RNA that forms part of the structure of a ribosome and participates in the synthesis of proteins. Ribosomal RNA is produced by transcription of genes which, in eukaryotic cells, are present in multiple copies. In human cells, the approximately 250 copies of rRNA genes (i.e., genes which encode rRNA) per haploid genome are spread out in clusters on at least five different chromosomes (chromosomes 13, 14, 15, 21 and 22). In human cells, multiple copies of the highly conserved rRNA genes are located in a tandemly arranged series of rDNA units, which are generally about 40-45 kb in length and contain a transcribed region and a nontranscribed region known as spacer (i.e., intergenic spacer) DNA which can vary in length and sequence.

Functional non-coding regulatory RNAs (e.g. small nuclear or nucleolar RNAs. siRNAs and antisense RNAs) are also well known and characterized, and may be useful in some embodiments of the present disclosure in regulation of expression of coding or non-coding DNA sequences.

As used herein the term "selectable marker" refers to a gene introduced into a cell, particularly in the context of this invention into cells in culture, that confers a trait suitable for artificial selection. General use selectable markers are well-known to those of ordinary skill in the art. In preferred embodiments, selectable markers for use in a human synthetic chromosome system should be non-immunogenic in the human and include, but are not limited to: human nerve growth factor receptor (detected with a MAb, such as described in U.S. Pat. No. 6,365,373); truncated human growth factor receptor (detected with MAb); mutant human dihydrofolate reductase (DHFR; fluorescent MTX substrate available); secreted alkaline phosphatase (SEAP; fluorescent substrate available); human thymidylate synthase (TS; confers resistance to anti-cancer agent fluorodeoxyuridine); human glutathione S-transferase alpha (GSTA1; conjugates glutathione to the stem cell selective alkylator busulfan; chemoprotective selectable marker in CD34$^+$cells); CD24 cell surface antigen in hematopoietic stem cells; human CAD gene to confer resistance to N-phosphonacetyl-L-aspartate (PALA); human multi-drug resistance-1 (MDR-1; P-glycoprotein surface protein selectable by increased drug resistance or enriched by FACS); human CD25 (IL-2α; detectable by Mab-FITC); Methylguanine-DNA methyltransferase (MGMT; selectable by carmustine); and Cytidine deaminase (CD; selectable by Ara-C). Drug selectable markers such as puromycin, hygromycin, blasticidin, G418, tetracycline may also be employed. In addition, using FACs sorting, any fluorescent marker gene may be used for positive selection, as may chemiluminescent markers (e.g. Halotags), and the like.

"Site-specific recombination" refers to site-specific recombination that is effected between two specific sites on a single nucleic acid molecule or between two different molecules that requires the presence of an exogenous protein, such as an integrase or recombinase. Certain site-specific recombination systems can be used to specifically delete, invert, or insert DNA, with the precise event controlled by the orientation of the specific sites, the specific system and the presence of accessory proteins or factors. In addition, segments of DNA can be exchanged between chromosomes as described in FIG. 4 (chromosome arm exchange).

"Synthetic chromosomes" (also referred to as "artificial chromosomes") are nucleic acid molecules, typically DNA, that have the capacity to accommodate and express heterologous genes and that stably replicate and segregate alongside endogenous chromosomes in cells. A "mammalian synthetic chromosome" refers to chromosomes that have an active mammalian centromere(s). A "human synthetic chromosome" refers to a chromosome that includes a centromere that functions in human cells and that preferably is produced in human cells. For exemplary artificial chromosomes, see, e.g., U.S. Pat. Nos. 8,389,802; 7,521,240; 6,025,155; 6,077,697; 5,891,691; 5,869,294; 5,721,118; 5,712,134; 5,695,967; and 5,288,625 and published International PCT application Nos., WO 97/40183 and WO 98/08964.

The terms "subject", "individual" or "patient" may be used interchangeably herein and refer to a mammal, and in some embodiments, a human.

A "vector" is a replicon, such as plasmid, phage, viral construct, cosmid, bacterial artificial chromosome, P-1 derived artificial chromosome or yeast artificial chromosome to which another DNA segment may be attached. In some instances a vector may be a chromosome such as in the case of an arm exchange from one endogenous chromosome engineered to comprise a recombination site to a synthetic chromosome. Vectors are used to transduce and express a DNA segment in cell.

As used herein, the term "Xic" refers to sequences at the X inactivation center present on the X chromosome that control the silencing of that X chromosome. As used herein, the term "Xist" refers to the X-inactive specific transcript gene that encodes a large non-coding RNA that is responsible for mediating silencing of the X chromosome from which it is transcribed. "Xist" refers to the RNA transcript. As used herein, the term "Tsix" refers to a gene that encodes a large RNA which is not believed to encode a protein. "Tsix" refers to the Tsix RNA, which is transcribed antisense to Xist; that is, the Tsix gene overlaps the Xist gene and is transcribed on the opposite strand of DNA from the Xist gene. Tsix is a negative regulator of Xist. As used herein, the term "Xic" also refers to genes and nucleic acid sequences derived from nonhuman species and human gene variants with homology to the sequences at the X inactivation center present on the X chromosome that control the silencing of that X chromosome in humans.

The Invention

The present invention encompasses compositions and methods to create a whole chromosome regulatable kill switch to regulate (activate or inactivate) expression of each of the therapeutic genes expressed from a synthetic chromosome. One roadblock to gene therapy to date has been the inability to turn off gene expression once gene therapy is completed or in case of an adverse reaction to the one or more expressed gene products. Nature has evolved chromosome inactivation mechanisms to compensate for gene dosage in species in which the sexes have different complements of a sex chromosome. In humans, the homogametic sex is female containing two copies of the X chromosome, whereas the heterogametic sex is male and contains only one copy of an X chromosome in addition to one copy of a Y chromosome. A means to inactivate one X chromosome evolved to ensure that males and females have similar expression of genes from the X chromosome. Inactivation is achieved by expression of a long non-coding RNA called Xist (X-inactive specific transcript) that is essential for initiation of X chromosome inactivation but is dispensable for maintenance of the inactive state of the X chromosome in differentiated cells. Xist acts in cis to induce heterchromatization of the chromosome from which it is expressed. The Xist gene is located within a region on the X chromosome called the X inactivation center (Xic) that spans over 1 megabase of DNA and contains both long non-coding RNAs and protein coding genes necessary and sufficient for initiation of X chromosome inactivation.

Xist expression is regulated in part by Tsix, which is transcribed antisense across Xist. Expression of Tsix prevents expression of Xist on the active chromosome and deletion of Tsix leads to skewed X inactivation such that the mutated chromosome is always inactivated. Inactivation occurs whenever there is more than one Xic present in a cell; thus, inactivation of the synthetic chromosome incorporating an Xic or specific Xic gene products would occur regardless of the sex of the cell into which it is introduced. Notably, evidence indicates that Xist-induced silencing also can occur on autosomes. The Xist cDNA has been inducibly expressed on one chromosome 21 in trisomy 21-induced pluripotent stem cells and demonstrated to induce heterochromatization and silencing of that chromosome 21. (see, e.g., Jiang J, et al, Nature 500 (7462): 296-300 (2013)) To date, Xic has not been used in its entirety to induce silencing. Because Xic contains all the cis acting elements necessary for Xist expression and subsequent chromosome inactivation, Xic more accurately recapitulates natural silencing. Importantly, pluripotency factors expressed in stem cells and induced pluripotent stem cells (iPSCs) prevent Xist expression; therefore, expression of a therapeutic gene from a synthetic chromosome incorporating Xic would occur in stem cells and be silenced through chromosome inactivation as the cells become differentiated. Thus, embodiments of the invention contemplate inclusion on a synthetic chromosome of an entire Xic region, or inclusion of select regions, including Xist with or without Tsix.

Synthetic Chromosome Producing Cells

The mammalian synthetic chromosomes expressing Xist and Tsix of the present invention are produced in cell lines in vitro before being used to transform target cells, preferentially human cell lines, human pluripotent cells, and induced pluripotent cells. In some embodiments, the cells to be engineered to produce the synthetic chromosomes can be cells that naturally occur in a subject (e.g., human patient) in which the genes or regulatory sequences from the synthetic chromosome will ultimately be expressed. Such cells can be primary-culture cell lines established for the purpose of synthetic chromosome production specific for an individual. In other embodiments, the cells to be engineered and/or produce the synthetic chromosome are from an established cell line. A wide variety of cell lines for tissue culture are known in the art. Examples of cell lines include but are not limited to human cells lines such as 293-T (embryonic kidney), 721 (melanoma), A2780 (ovary), A172 (glioblastoma), A253 (carcinoma), A431 (epithelium), A549 (carcinoma), BCP-1 (lymphoma), BEAS-2B (lung), BR 293 (breast), BxPC3 (pancreatic carcinoma), Cal-27 (tongue), COR-L23 (lung), COV-434 (ovary), CML T1 (leukemia), DUI45 (prostate), DuCaP (prostate), FM3 (lymph node), H1299 (lung), H69 (lung), HCA2 (fibroblast), HEK0293 (embryonic kidney), HeLa (cervix), HL-60 (myeloblast), HMEC (epithelium), HT-29 (colon), HUVEC (umbilical vein epithelium), Jurkat (T cell leukemia), JY (lymphoblastoid), K562 (lymphoblastoid), KBM-7 (lymphoblastoid), Ku812 (lymphoblastoid), KCL22 (lymphoblastoid), KGI (lymphoblastoid), KYO1 (lymphoblastoid), LNCap (prostate), Ma-Mel (melanoma), MCF-7 (mammary gland), MDF-10A (mammary gland), MDA-MB-231, -468 and -435 (breast), MG63 (osteosarcoma), MOR/0.2R (lung), MONO-MAC6 (white blood cells), MRCS (lung), NCI-H69 (lung), NALM-1 (peripheral blood), NW-145 (melanoma), OPCN/OPCT (prostate), Peer (leukemia), Raji (B lymphoma), Saos-2 (osteosarcoma), Sf21 (ovary), Sf9 (ovary), SiHa (cervical cancer), SKBR3 (breast carcinoma), SKOV-2 (ovary carcinoma), T-47D (mammary gland), T84 (lung), U373 (glioblastoma), U87 (glioblastoma), U937 (lymphoma), VCaP (prostate), WM39 (skin), WT-49 (lymphoblastoid), and YAR (B cell). In some embodiments non-human cell lines may be employed. Rodent cell lines of interest include but are not limited to 3T3 (mouse fibroblast), 4T1 (mouse mammary), 9L (rat glioblastoma), A20 (mouse lymphoma), ALC (mouse bone marrow), B16 (mouse melanoma), B35 (rat neuroblastoma), bEnd.3 (mouse brain), C2C12 (mouse myoblast), C6 (rat glioma), CGR8 (mouse embryonic), CT26 (mouse carcinoma), E14Tg2a (mouse embryo), EL4 (mouse leukemia), EMT6/AR1 (mouse mammary), Hepa1c1c7 (mouse hepatoma), J558L (mouse myeloma), MC-38 (mouse adenocarcinoma), MTD-1A (mouse epithelium), RBL (rat leukemia), RenCa (mouse carcinoma), X63 (mouse lymphoma), YAC-1 (mouse Be cell), BHK-1 (hamster kidney), and CHO (hamster ovary). In addition, embryonic cell lines; pluripotent cell lines; adult derived stem cells; reprogrammed cell lines; generic animal cell lines of any species or broadly embryonic or reprogrammed cells; primary dog cells; primary horse cells; chicken DT40 cells; dog cell lines; cat cell lines; patient autologous cell lines; and, in some preferred embodiments, the HT1080 human cell line can be utilized. Potential cells of use include any mammalian cell, but those from humans are specifically and preferentially contemplated. These cell lines and others are available from a variety of sources known to those with skill in the art (see, e.g., the American Type Culture Collection (ATCC) (Manassas, Va.)). The synthetic chromosome producing cell line can then be maintained in culture, or alternatively, the synthetic chromosome(s) can be isolated from the synthetic chromosome producing cell line and transfected into a different cell line for maintenance before ultimately being transfected into a target mammalian cell.

Synthetic Chromosome Production

The engineering of target cells to incorporate a kill switch can be accomplished by incorporating an X inactivation center (Xic) or one or more genes from an Xic into a synthetic chromosomes produced by any method currently employed in the art. That is, the Xic-incorporating synthetic chromosomes of the present invention may be created by any of the "top down", "bottom up", engineering of minichromosomes, and induced de novo chromosome generation methods used in the art.

The "bottom up" approach of synthetic chromosome formation relies on cell-mediated de novo chromosome formation following transfection of a permissive cell line with cloned a-satellite sequences, which comprise typical host cell-appropriate centromeres and selectable marker gene(s), with or without telomeric and genomic DNA. (For protocols and a detailed description of these methods see, e.g., Harrington, et al., Nat. Genet., 15:345-55 (1997); Ikeno, et al., Nat. Biotechnol., 16:431-39 (1998); Masumoto, et al., Chromosoma, 107:406-16 (1998), Ebersole, et al., Hum. Mol. Gen., 9:1623-31 (2000); Henning, et al., PNAS USA, 96:592-97 (1999); Grimes, et al., EMBO Rep. 2:910-14 (2001); Mejia, et al., Genomics, 79:297-304 (2002); and Grimes, et al., Mol. Ther., 5:798-805 (2002).) Both synthetic and naturally occurring α-satellite arrays, cloned into yeast artificial chromosomes, bacterial artificial chromosomes, or P1-derived artificial chromosome vectors have been used in the art for de novo synthetic chromosome formation. The products of bottom up assembly can be linear or circular, comprise simplified and/or concatamerized input DNA with an a-satellite DNA based centromere, and typically range between 1 and 10 Mb in size. Bottom up-derived synthetic chromosomes also are engineered to incorporate nucleic acid sequences that permit site-specific integration of target DNA sequences onto the synthetic chromosome.

The "top down" approach of producing synthetic chromosomes involves sequential rounds of random and/or targeted truncation of pre-existing chromosome arms to result in a pared down synthetic chromosome comprising a centromere, telomeres, and DNA replication origins. (For protocols and a detailed description of these methods see, e.g., Heller, et al., PNAS USA, 93:7125-30 (1996); Saffery, et al., PNAS USA, 98:5705-10 (2001); Choo, Trends Mol. Med., 7:235-37 (2001); Barnett, et al., Nuc. Ac. Res., 21:27-36 (1993); Farr, et al., PNAS USA, 88:7006-10 (1991); and Katoh, et al., Biochem. Biophys. Res. Commun., 321:280-90 (2004).) "Top down" synthetic chromosomes are constructed optimally to be devoid of naturally-occurring expressed genes and are engineered to contain DNA sequences that permit site-specific integration of target DNA sequences onto the truncated chromosome, mediated, e.g., by site-specific DNA integrases.

A third method of producing synthetic chromosomes known in the art is engineering of naturally occurring minichromosomes. This production method typically involves irradiation-induced fragmentation of a chromosome containing a functional, e.g., human neocentromere possessing centromere function yet lacking α-satellite DNA sequences and engineered to be devoid of non-essential DNA. (For protocols and a detailed description of these methods see, e.g., Auriche, et al., EMBO Rep. 2:102-07 (2001); Moralli, et al., Cytogenet. Cell Genet., 94:113-20 (2001); and Carine, et al., Somat. Cell Mol. Genet., 15:445-460 (1989).) As with other methods for generating synthetic chromosomes, minichromosomes can be engineered to contain DNA sequences that permit site-specific integration of target DNA sequences.

The fourth approach for production of synthetic chromosomes involves induced de novo chromosome generation by targeted amplification of specific chromosomal segments. This approach involves large-scale amplification of pericentromeric/ribosomal DNA regions situated on acrocentric chromosomes. The amplification is triggered by co-transfection of excess DNA specific to the pericentric region of chromosomes, such as ribosomal RNA, along with DNA sequences that allow for site-specific integration of target DNA sequences and also a drug selectable marker, which integrates into the pericentric regions of the chromosomes. (For protocols and a detailed description of these methods see, e.g., Csonka, et al., J. Cell Sci 113:3207-16 (2002); Hadlaczky, et al., Curr. Opin. Mol. Ther., 3:125-32 (2001); and Lindenbaum and Perkins, et al., Nuc. Ac. Res., 32(21): e172 (2004).) During this process, targeting to the pericentric regions of acrocentric chromosomes with co-transfected DNA induces large-scale chromosomal DNA amplification, duplication/activation of centromere sequences, and subsequent breakage and resolution of dicentric chromosomes resulting in a "break-off" satellite DNA-based synthetic chromosome containing multiple site-specific integration sites.

The vectors carrying the components appropriate for synthetic chromosome production can be delivered to the cells to produce the synthetic chromosome by any method known in the art. The terms transfection and transformation refer to the taking up of exogenous nucleic acid, e.g., an expression vector, by a host cell whether or not any coding sequences are, in fact, expressed. Numerous methods of transfection are known to the ordinarily skilled artisan, for example, by Agrobacterium-mediated transformation, protoplast transformation (including polyethylene glycol (PEG)-mediated transformation, electroporation, protoplast fusion, and microcell fusion), lipid-mediated delivery, liposomes, electroporation, sonoporation, microinjection, particle bombardment and silicon carbide whisker-mediated transformation and combinations thereof (see, e.g., Paszkowski, et al., EMBO J., 3:2717-2722 (1984); Potrykus, et al., Mol. Gen. Genet., 199:169-177 (1985); Reich, et al., Biotechnology, 4:1001-1004 (1986); Klein, et al., Nature, 327:70-73 (1987); U.S. Pat. No. 6,143,949; Paszkowski, et al., in *Cell Culture and Somatic Cell Genetics of Plants*, Vol. 6, Molecular Biology of Plant Nuclear Genes, (Schell and Vasil, eds., Academic Publishers 1989); and Frame, et al., Plant J., 6:941-948 (1994)); direct uptake using calcium phosphate (Wigler, et al., Proc. Natl. Acad. Sci. U.S.A., 76:1373-1376 (1979)); polyethylene glycol (PEG)-mediated DNA uptake; lipofection (see, e.g., Strauss, Meth. Mol. Biol., 54:307-327 (1996)); microcell fusion (Lambert, Proc. Natl. Acad. Sci. U.S.A., 88:5907-5911 (1991); U.S. Pat. No. 5,396,767; Sawford, et al., Somatic Cell Mol. Genet., 13:279-284 (1987); Dhar, et al., Somatic Cell Mol. Genet., 10:547-559 (1984); and McNeill-Killary, et al., Meth. Enzymol., 254:133-152 (1995)); lipid-mediated carrier systems (see, e.g., Teifel, et al., Biotechniques, 19:79-80 (1995); Albrecht, et al., Ann. Hematol., 72:73-79 (1996); Holmen, et al., In Vitro Cell Dev. Biol. Anim., 31:347-351 (1995); Remy, et al., Bioconjug. Chem., 5:647-654 (1994); Le Bolch, et al., Tetrahedron Lett., 36:6681-6684 (1995); and Loeffler, et al., Meth. Enzymol., 217:599-618 (1993)); or other suitable methods. Methods for delivery of synthetic chromosomes also are described in U.S. application Ser. No. 09/815,979. Successful transfection is generally recognized by detection of the presence of the heterologous nucleic acid within the transfected cell, such as, for example, any visualization of the heterologous nucleic acid, expression of a selectable marker or any indication of the operation of a vector within the host cell. For a description of delivery methods useful in practicing the present invention, see U.S. Pat. Nos. 5,011,776; 5,747,308; 4,966,843; 5,627,059; 5,681,713; Kim and Eberwine, Anal. Bioanal. Chem. 397 (8): 3173-3178 (2010).

The choice of vector to be used in delivery of the components of the synthetic chromosomes including the Xic or specific Xic gene expression vectors will depend upon a variety of factors such as the type of cell in which propagation is desired. Certain vectors are useful for amplifying and making large amounts of the desired DNA sequence, while other vectors are suitable for expression in cells in culture. The choice of appropriate vector is well within the skill of those in the art, and many vectors are available commercially. To prepare the constructs, a polynucleotide is inserted into a vector, typically by means of ligation of a sequence into a cleaved restriction enzyme site in the vector. Alternatively, the desired nucleotide sequence (e.g., Xic or specific Xic genes) can be inserted by homologous recombination or site-specific recombination. Typically homologous recombination is accomplished by attaching regions of homology (e.g., cre-lox, att sites, etc.) to the vector on the flanks of the desired nucleotide sequence. Nucleic acids containing such sequences can be added by, for example, ligation of oligonucleotides, or by polymerase chain reaction using primers comprising both the region of homology and a portion of the desired nucleotide sequence. Exemplary vectors that may be used include but are not limited to those derived from recombinant bacteriophage DNA, plasmid DNA or cosmid DNA.

For example, plasmid vectors such as pBR322, pUC 19/18, pUC 118, 119 and the M13 mp series of vectors may be used. Bacteriophage vectors may include λgt10, λgt11, λgt18-23, λZAP/R and the EMBL series of bacteriophage vectors. Cosmid vectors that may be utilized include, but are not limited to, pJB8, pCV 103, pCV 107, pCV 108, pTM, pMCS, pNNL, pHSG274, COS202, COS203, pWE15, pWE16 and the charomid 9 series of vectors. Additional vectors include bacterial artificial chromosomes (BACs) based on a functional fertility plasmid (F-plasmid), yeast artificial chromosomes (YACs), and P1-derived artificial chromosomes, DNA constructs derived from the DNA of P1 bacteriophage (PACS). Alternatively and preferably, recombinant virus vectors may be engineered, including but not limited to those derived from viruses such as herpes virus, retroviruses, vaccinia virus, poxviruses, adenoviruses, lentiviruses, adeno-associated viruses or bovine papilloma virus.

An artificial chromosome expression system (ACE system) has been described previously as a means to introduce large payloads of genetic information into the cell (Lindenbaum and Perkins, et al., Nuc. Ac. Res., 32(21):e172 (2004); Perkins et al., US Pat. Pub. No. 20060246586; Perkins et al., US Pat. Pub. No. 20030119104; Perkins, et al., US Pat. Pub. No. 20050181506; and Perkins, et al., U.S. Pat. No. 7,521,240. The ACE System consists of a platform chromosome (ACE chromosome) containing approximately 75 site-specific, recombination acceptor sites that can carry single or multiple copies of genes of interest using specially designed ACE targeting vectors (pAPP) and a site-specific integrase (ACE Integrase). The ACE Integrase is a derivative of the bacteriophage lambda integrase (INT) engineered to direct site-specific unidirectional recombination in mammalian cells in lieu of bacterial encoded, host integration accessory factors (λINTR). The transfer of an ACE chromosome carrying multiple copies of a red fluorescent protein reporter gene into human MSCs has been demonstrated (Lindenbaum and Perkins, et al., Nuc. Ac. Res., 32(21):e172 (2004)). Fluorescent in situ hybridization and fluorescent microscopy demonstrated that the ACEs were stably maintained as single chromosomes and expression of transgenes in both MSCs and differentiated cell types is maintained (Vanderbyl et al., 2004).

Figure 1:
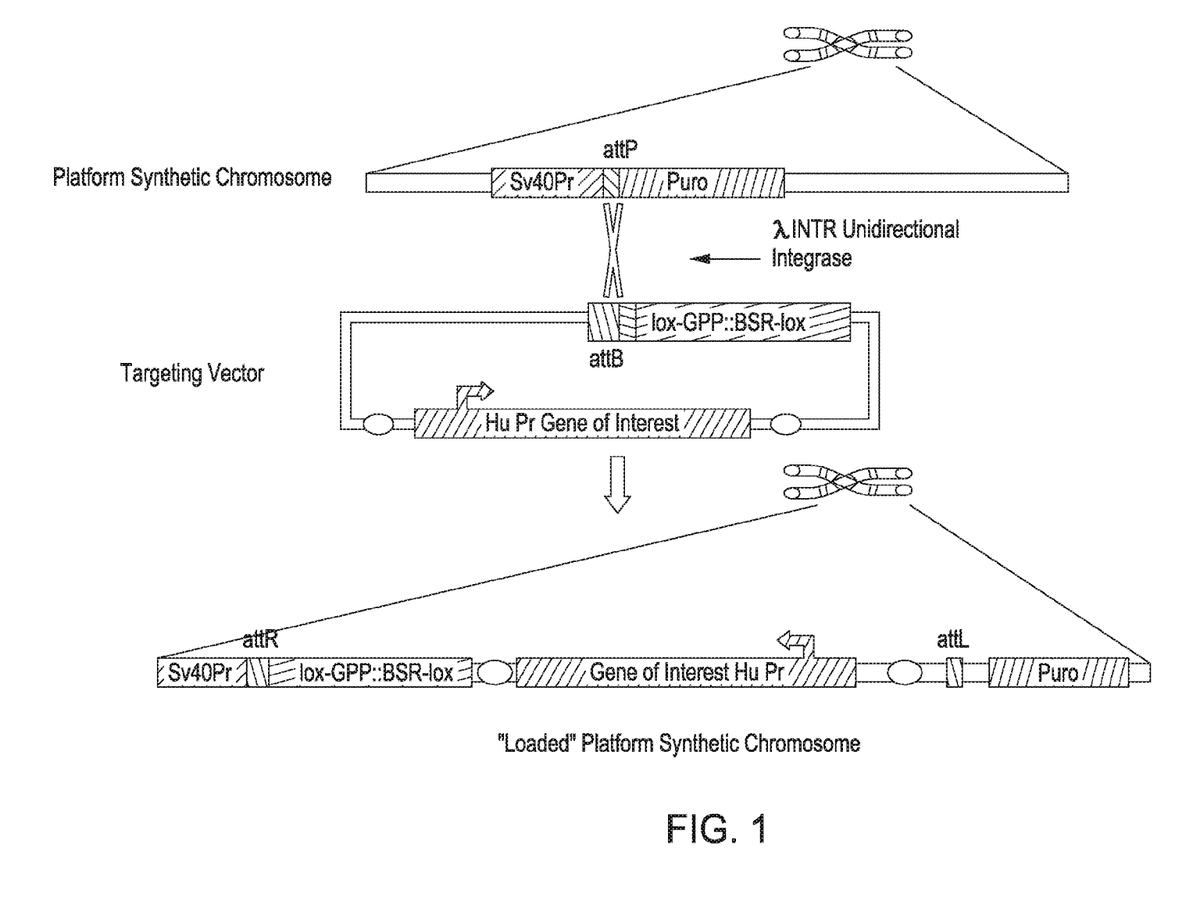
FIG. 1 is a simplified depiction of the synthetic chromosome system.
Figure 2:
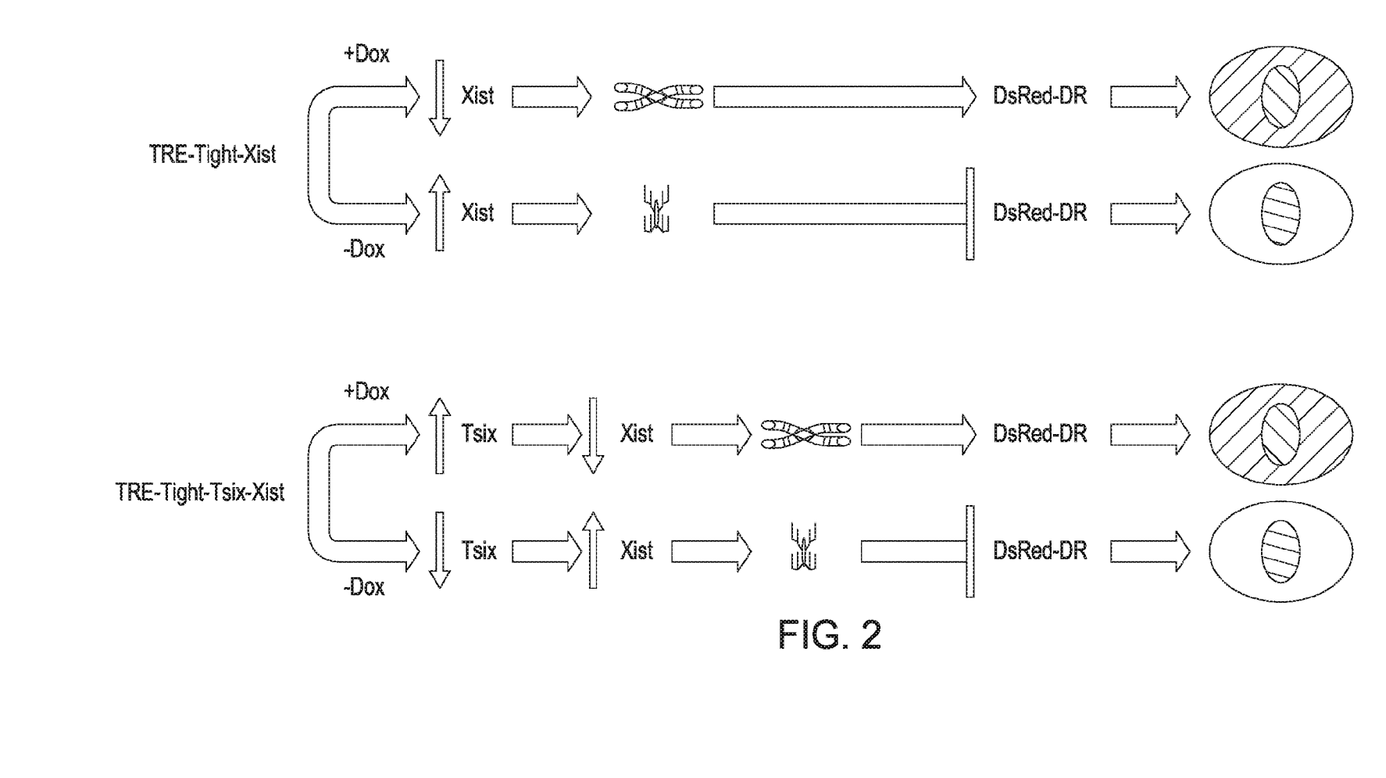
FIG. 2 is a schematic overview of two exemplary whole chromosome kill switch strategies.

FIG. 1 is a simplified depiction of the step of loading a gene of interest onto a platform synthetic chromosome. The synthetic chromosomes are engineered to contain multiple recombination acceptor sites (e.g., 75 such sites). λINTR integrase is derived and modified from lambda phage integrase. Transgenes (genes of interest) are introduced via λINTR integrase mediated targeting to the platform synthetic chromosome via attP x attB recombination.

Xic or Xic Gene Product Expression Cassettes

The Xic or select Xic gene product expression cassette of the present invention that is inserted into a synthetic chromosome provides transcriptional and translational regulatory sequences, and in some preferred embodiments provides for inducible or repressible expression of Xic gene products. In general, the transcriptional and translational regulatory sequences may include, but are not limited to, promoter sequences, ribosomal binding sites, transcriptional start and stop sequences, translational start and stop sequences, repressible sequences, and enhancer or activator sequences.

In general, the regulatable (inducible/repressible) promoters of use in the present invention are not limited, as long as the promoter is capable of inducing (i.e. "turning on" or "upregulating") or repressing ("turning off" or "downregulating") expression of the downstream gene in response to an external stimulus. In the context of a regulatory sequence such as a promoter, the term "inducible" is used generally to mean "controllable." "regulatable" or "reversible," because expression of the regulatable sequence can be turned on and off, like a switch. One such system involves tetracycline-controlled transcriptional activation where transcription is reversibly turned on (Tet-On) or off (Tet-Off) in the presence of the antibiotic tetracycline or a derivative thereof, such as doxycycline. In a Tet-Off system, expression of tetracycline response element-controlled genes can be repressed by tetracycline and its derivatives. Tetracycline binds the tetracycline transactivator protein, rendering it incapable of binding to the tetracycline response element sequences, preventing transactivation of tetracycline response element-controlled genes. In a Tet-On system on the other hand, the tetracycline transactivator protein is capable of initiating expression only if bound by tetracycline; thus, introduction of tetracycline or doxycycline initiates the transcription of the Xic gene product in toto or specific Xic genes. Another inducible promoter system known in the art is the estrogen receptor conditional gene expression system. Compared to the Tet system, the estrogen receptor system is not as tightly controlled; however, because the Tet system depends on transcription and subsequent translation of a target gene, the Tet system is not as fast-acting as the estrogen receptor system. Alternatively, a Cumate Switch Inducible expression system—in the repressor configuration—may be employed. The Cumate Switch Inducible expression system is based on the bacterial repressor controlling the degradative pathway for p-cymene in *Pseudomonas putida*. High levels of the reaction product, p-cumate, allow binding of the repressor CymR to the operator sequences (CmO) of the p-cym and p-cmt operon. Other systems employing small molecules to regulate transcription are also envisioned as useful in the methods and compositions of the present disclosure.

As stated above, the entire Xic region may be loaded on to the synthetic chromosome due to the ability of synthetic chromosomes to accommodate very large genetic payloads, or select regions from Xic may be used, including Xist with or without Tsix. The Tsix-Xist genomic region is located on the long arm of the X chromosome at Xq13.2. The Xist and Tsix long non-coding RNAs are transcribed in antisense directions. The Xist gene is over 32 Kb in length while the Tsix gene is over 37 Kb in length. In addition, the entire X chromosome inactivation center, Xic (>1 Mbp in size), may be loaded onto the synthetic chromosome, e.g., as a series of overlapping, engineered BACs.

Transforming the Mammalian Target Cells

To date, isolation and transfer of artificial chromosomes has involved utilizing microcell mediated cell transfer (MMCT) technology or dye-dependent chromosome staining with subsequent flow cytometric-based sorting. In the MMCT technique, donor cells are chemically induced to multinucleate their chromosomes with subsequent packaging into microcells and eventual fusion into recipient cells. The establishment of transferred chromosomes in the recipient cells is carried out with drug selection and intact delivery of the transferred chromosome confirmed by FISH. For flow cytometric-based transfer, mitotically arrested chromosomes are isolated and stained with DNA specific dyes and flow sorted based on size and differential dye staining. The flow-sorted chromosomes are then delivered into recipient cells via standard DNA transfection technology, and delivery of intact chromosomes is determined by FISH.

As an alternative, CRISPR editing technologies can be adapted to visualize the synthetic chromosomes and to isolate and purify the synthetic chromosomes prior to delivery to target cells. (See co-pending patent application PCT/US16/17179.) In this process, unique DNA elements/sequences are incorporated into the synthetic chromosomes during production in the synthetic chromosome production cells. The presence of these unique DNA elements/sequences on the synthetic chromosome permits specific targeting of an engineered, nuclease deficient CRISPR/Cas-fluorescent protein visualization complex (CRISPR/CAS- FP) directly to the synthetic chromosome without binding to native, endogenous chromosomes. Subsequently, the binding of the CRISPR/CAS-FP to the synthetic chromosome provides a means to purify the synthetic chromosome by flow cytometry/flow sorting for eventual delivery into recipient cells. The synthetic chromosome production cells are subjected to mitotic arrest followed by purification of the synthetic chromosome by flow cytometry/flow sorting based on the unique CRISPR-fluorescent tag binding to the synthetic chromosome.

The employment of CRISPR/CAS-FP bypasses the need for using potentially mutagenic chromosome dyes and alleviates the potential contamination of dye-stained endogenous chromosomes contaminating preparations of flow-sorted synthetic chromosomes. In addition, purified synthetic chromosomes bound with CRISPR/Cas-FP can be utilized for assessing the efficiency of delivery of flow-sorted synthetic chromosomes into recipient target cells by simple measurement of fluorescent signal quantity in a transfected recipient cell population. Fluorescent proteins of particular use include but are not limited to TagBFP, TagCFP, TagGFP2, TagYFP, TagRFP, FusionRed, mKate2, TurboGFP, TurboYFP, TurboRFP, TurboFP602, TurboFP635, or TurboFP650 (all available from Evrogen, Moscow); AmCyan1, AcvGFP1, ZsGreen1, ZsYellow1, mBanana, mOrange, mOrange2, DsRed-Express2, EsRed-Express, tdTomato, DsRed-Monomer, DsRed2, AsRed2, mStrawberry, mCherry, HcRed1, mRaspberry, E2-Crimson, mPlum, Dendra 2, Timer, and PAmCherry (all available from Clontech, Palo Alto, Calif.); HALO-tags; infrared (far red shifted) tags (available from Promega, Madison, Wis.); and other fluorescent tags known in the art, as well as fluorescent tags subsequently discovered.

Applications

Progress in bioengineering of cells for gene-based therapies has been held back by the absence of the one indispensable tool required to address complex polygenicity and/or delivery of large genetic payloads: a stable, non-integrating, self-replicating and biocompatible intracellular platform that ensures controlled expression. Synthetic chromosomes provide a breakthrough in biological bandwidth required to manage complex polygenic challenges and introduction of large genetic payloads. Synthetic chromosomes provide a chromosome-vector based bioengineering system that can be readily purified from host (engineering) cells and transferred to recipient (patient) cells by standard transfection protocols. One roadblock to wide implementation of gene- and cell-based therapy, however, is the ability to turn off gene expression once therapy is completed.

For example, the whole chromosome "kill switch" or inactivation could be used when treatment is complete and the expression of gene products from the synthetic chromosome is no longer necessary for the patient. Additionally, the whole chromosome "kill switch" or inactivation could be used if there is an adverse reaction to the expression of the gene products from the synthetic chromosome requiring termination of treatment. In yet another instance, the whole chromosome "kill switch" or inactivation could be used if the synthetic chromosome is contained within a specific type of cell for a cell-based treatment, and the cells transform into an undesired cell type or migrate to an undesirable location such that the expression of the factors on the synthetic chromosome are deleterious.

EXAMPLES

The following examples are put forth so as to provide those of ordinary skill in the art with a complete disclosure and description of how to make and use the present invention, and are not intended to limit the scope of what the inventors regard as their invention, nor are they intended to represent or imply that the experiments below are all of or the only experiments performed. It will be appreciated by persons skilled in the art that numerous variations and/or modifications may be made to the invention as shown in the specific embodiments without departing from the spirit or scope of the invention as broadly described. The present embodiments are, therefore, to be considered in all respects as illustrative and not restrictive.

Efforts have been made to ensure accuracy with respect to numbers used (e.g., amounts, temperature, etc.) but some experimental errors and deviations should be accounted for. Unless indicated otherwise, parts are parts by weight, molecular weight is weight average molecular weight, temperature is in degrees centigrade, and pressure is at or near atmospheric.

Example 1

De Novo Generation of Satellite DNA-Based Artificial Chromosome

For de novo production of synthetic chromosomes, exogenous DNA sequences are introduced into the HT1080 synthetic chromosome production cell line, and, upon integration into the pericentric heterochromatic regions of acrocentric chromosomes, a large-scale amplification of the short arms of the acrocentric chromosome (rDNA/centromere region) is triggered. During the amplification event, the centromere is duplicated resulting in a dicentric chromosome with two active centromeres. Subsequent mitotic events result in cleavage and resolution of the dicentric chromosome, leading to a breakoff of approximately 40-80 Mb in size comprised predominantly of satellite repeat sequences with subdomains of coamplified transfected transgene that may also contain amplified copies of rDNA. The newly-generated synthetic chromosome is validated by observation of fluorescent chromosome painting, via the endogenous chromosome tag and synthetic chromosome tag that has been engineered into the HT1080 synthetic chromosome production cell line.

The day before transfection, the HT1080 synthetic chromosome production cell line cells were split to a density of approximately 1.0 to $1.5 \times 10^6$ adherent cells into 10 cm tissue culture dishes, and the vectors were purified (e.g., using a Qiagen EndoFree Plasmid Maxi Kit), linearized, and the concentration of the vectors was determined for transfection. The cultured HT1080 cells were fed 3-5 hours before transfection. 20-25 µg per 10 cm semiconfluent tissue culture dish was used to transfect the HT1080 cells using, e.g., Invitrogen's Calcium Phosphate Transfection Kit. Cells were maintained for 2-3 days post-transfection at which point they were trypsinized and replated in selective medium. Selective conditions were maintained for 10-14 days with media changed every 2-3 days. Antibiotic resistant clones were picked when a colony reached 2-3 mm in diameter. Colonies that were well separated were preferred. Cells were removed by use of a cloning cylinder and trypsin, and transferred to a 6-well plate for expansion.

Example 2

Testing the Efficacy of Inducible Xist to Silence Expression of RFP on a Synthetic Chromosome Chromosome Engineering Inducible expression of Xist introduced as a transgene onto an autosome can drive inactivation of that chromosome in iPSCs. The present example demonstrates the ability of an inducible Xist to inactivate expression of the DsRed-DR fluorescent marker (RFP) expressed from a synthetic chromosome in iPSCs. The use of synthetic chromosomes to address polygenic disorders and multi-therapeutic genetic-based treatments is enhanced by a whole chromosome kill switch to silence gene expression after therapeutic goals are reached.

A synthetic chromosome is engineered to contain RFP. Chromosome engineering occurs in the DG44 Chinese Hamster Ovary cell line. All cloning is performed using the In-Fusion cloning system (Clontech, Mountain View, CA). All DNA sequences that are to be loaded onto the synthetic chromosome are first transferred to the pAPP chromosome loading vector. Four vectors containing green fluorescent protein (GFP) gene fused to the blasticidin resistance gene (BSR) flanked by loxP sites have been engineered for this use. Each vector contains a pair of modified loxP sites flanking the GFP-BSR allowing it to be recycled for repeated synthetic chromosome loadings. Once the first DNA sequence is loaded and the chromosome analyzed, cells are transfected with Cre recombinase, resulting in excision of the GFP-BSR making the clone amenable to loading of a second DNA sequence with blasticidin selection. In this way, the GFP-BSR cassettes can be recycled. Following Cre excision, cells are sorted to isolate those that no longer express GFP. Correct excision of the GFP-BSR cassette is confirmed by PCR prior to loading a subsequent DNA sequence. At each step, the engineered synthetic chromosomes are assessed for correct integration using PCR-based assays that confirm appropriate targeted integration onto the platform synthetic chromosome. The presences of resulting attB x attP recombination products (attR and attL junctions) are confirmed by PCR.

The pAPP chromosome loading vector is engineered to contain the DsRed-DR coding sequence (Clontech, Mountain View, CA), a destabilized variant of *Discosoma* sp. derived red fluorescent protein with a short half-life, under regulation of the CMV promoter. The DsRed-DR is loaded onto the synthetic chromosome as described above and single cell clones with bright fluorescence are isolated by FACS. The second step of chromosome engineering involves loading the tetracycline-controlled transactivator, tTA, onto the synthetic chromosome in clones with highest DsRed-DR expression. Clones with undetectable background expression and high levels of expression in the absence of the tetracycline analog doxycycline (Dox) are identified using a luciferase reporter construct under control of the tetracycline responsive element (TRE). Finally, the Xist cDNA (Origene) is cloned into the pTRE-Tight tetracycline response vector to minimize background expression. The TRE-Tight-Xist construct is transferred to the pAPP loading vector as described above and subsequently loaded on the synthetic chromosome. In this instance, DG44 cells are cultured in the presence of doxycycline to ensure the Xist cDNA is not expressed prematurely. Once clones have been selected, the DG44 cells are transferred to medium either with or without doxycycline and mRNA is isolated every 24 hours for 5 days. Xist expression levels are assessed by real time PCR. Clones with tight, inducible expression of Xist are used for downstream experiments.

It is expected that Xist expression in the differentiated DG44 cells will not result in inactivation of DsRed-DR expression; however, the cells are assessed microscopically for red fluorescence. If red fluorescence is quenched in DG44 in the absence of doxycycline, real time PCR is used for confirmation that this is due to silenced expression. Additionally, it is determined that the synthetic chromosome has become heterochromatinized by the assays described infra.

Transfer to iPSC

The TRE-Tight-Xist DsRed-DR synthetic chromosome is isolated from DG44 cells by FACS following well-established protocols. The synthetic chromosome is transferred to iPSCs using lipofectamine During synthetic chromosome transfer and the selection process, iPSCs are cultured in the presence of doxycycline to prevent premature expression of Xist.

Assay the Effectiveness of Xist to Silence DsRed-DR Expression

All experiments are carried out as time course experiments with biological preparations taken every 24 hours for analysis. All experiments are conducted in biological triplicates. The iPSCs are cultured in the presence and absence of doxycycline. In this series of experiments, the +Doxycycline group represents the control, in which Xist is silenced.

Cells are collected for FACS analysis and assessed for DsRed-DR expression. For microscopic analysis of DsRed-DR fluorescence, cells are cultured on glass coverslips and fixed in 3.7% formaldehyde. Cells are permeabilized with 0.5% NP-40, mounted on slides using Vectashield hard set mounting medium containing DAPI then are imaged using a Nikon A1 confocal microscope controlled by Nikon Elements AR software. A minimum of 5 fields are collected for each specimen. Specimens are assessed for the total number of red cells as well as red fluorescence intensity.

Loss of DsRed-DR fluorescence is confirmed to be due to silenced expression using quantitative real time PCR to assess mRNA levels. Taqman assays (Applied Biosystems, Foster City, CA) are used to detect expression of the Xist long non-coding RNA. A custom Taqman assay is designed for detection of DsRed-DR. Expression levels of DsRed-DR are normalized to the endogenous control GAPDH expression levels, expressed from host cell chromosomes. This also acts as a control to demonstrate that silencing is limited to genes on the synthetic chromosome. DsRed-DR expression levels are correlated with the frequency of red fluorescent cells in the population. Expression of Xist in iPSCs (-Doxycycline group) is anticipated to be correlated to fewer red fluorescent cells, which in turn is correlated to decreased DsRed-DR mRNA levels compared to cells cultured in the presence of doxycycline.

Assay Heterochromatinization following Xist Expression

Two markers of heterochromatinization are quantified to assess the levels of condensation following Xist expression: heterochromatin protein 1 alpha (HP1α), a marker of constitutive heterochromatin, and histone H3 tri-methylated on lysine 27 (triMe-H3K27), a marker of facultative heterochromatin found on the inactive X chromosome. Metaphase spreads are prepared by cytospin following hypotonic treatment in 0.07M KCl for 10 minutes at room temperature. Following fixation in 4% paraformaldehyde, cells are blocked in 3% BSA for 30 minutes. Synthetic chromosomes are incubated with a mouse monoclonal antibody to HP1α (ab151185; Abcam) or a rabbit polyclonal antibody to triMe-H3K27 (EpiGenTek) prior to incubation with appropriate fluorochrome conjugated secondary antibodies (Jackson ImmunoResearch). Synthetic chromosomes are then stained with DAPI and imaged as described above. The synthetic chromosomes are identified by FISH with a probe directed against the attPPuro sequence. An increase in triMe-H3K27 on the synthetic chromosomes following Xist expression is anticipated, while HP1α levels should remain unchanged at pericentromeric regions and act as a normalization control. In addition, levels of histone H4 acetylation on the synthetic chromosomes are quantified, which follows H3K27 trimethylation during X inactivation, during the time course of each experiment.

As an alternative approach, the EpiQuik Chromatin Accessibility Assay Kit (EpiGenTek) is used to assess chromatin accessibility. This kit combines nuclease sensitivity with a subsequent real time PCR assay to measure the chromatin structure of specific regions. DNA prepared from cells grown in the presence and absence of doxycycline are either mock treated or treated with nuclease. Real time PCR using primers for the attB sites along the synthetic chromosome as well as ones designed for the TRE controlling DsRed-DR expression are used to amplify the selected regions. If chromatin is condensed (heterochromatinized) the DNA is inaccessible to the nuclease and the target region is amplified. If the chromatin is in an open configuration, it is accessible to the nuclease and amplification of the target region is decreased or undetectable. Primers to control constitutively-expressed and silenced, e.g., human regions in iPS cells are provided. Amplification products are detected using SYBR green.

Example 3

Testing the Efficacy of Inducible Tsix to Silence Expression of RFP on a Synthetic Chromosome Chromosome Engineering Expression of Tsix prevents expression of Xist thereby preventing X chromosome inactivation. The genomic region encompassing the Tsix and Xist genes are loaded onto the synthetic chromosome constitutively expressing DsRed-DR as described above. Expression of Tsix is forced by placing it under control of the Tet-On system, ensuring that DsRed-DR expression is maintained when cells are cultured in the presence of doxycycline. In contrast, when doxycycline is removed, Tsix expression is silenced and Xist is expressed under control of its endogenous regulatory elements. The synthetic chromosome is preferentially inactivated in iPSCs.

The Tsix-Xist genomic region is located on the long arm of the X chromosome at Xq13.2. These long non-coding RNAs are transcribed in antisense directions. The Xist gene is over 32 Kb in length while the Tsix gene is over 37 Kb in length. The ability to transfer large genetic payloads is an advantage to using the synthetic chromosome. A BAC spanning the Tsix-Xist region, RP11-13M9, is available from Empire Genomics. This BAC contains 27,808 bp upstream of the Tsix start site and 66,382 bp downstream of the end of Xist. The BAC does not contain sequence for either flanking gene, CHIC1 or JPX.

The synthetic chromosome already containing the reverse tetracycline controlled transactivator as described above is engineered to constitutively express DsRed-DR. The RP11-13M9 BAC is engineered to render it amenable to loading onto the synthetic chromosome. In brief, PCR is used to amplify the lox-green fluorescent protein gene-blasticidin resistance gene-lox (lox-GFP::BSR-lox) region using a 5' primer, containing the attB sequence, with homology to the BAC at its 5' end (primer 1). The 3' primer (primer 2) contains homology to the 5' end of the TRE promoter. In addition, PCR is used to amplify the TRE from the TRE-tight vector (Clontech, Mountain View, CA) using primers that have homology to the 3' end of the attB-lox-GFP::BSR-lox PCR product and sequences just proximal to the Tsix start site to generate a TRE promoter fragment amenable to loading on the BAC upstream of the Tsix gene. Following purification of the attB-lox-GFP::BSR-lox and TRE PCR products, they are combined and used as template in a PCR reaction with primers 1 and 4. The resulting PCR product is loaded on the BAC using Red/ET recombination (Gene Bridges, Heidelberg, Germany) BAC clones are assessed for correct integration of the TRE-tight promoter, blasticidin resistance gene and attB site using PCR for predicted junctions. The retrofitted BAC is loaded on the DsRed-DR expressing synthetic chromosome using lambda integrase as previously described. Chromosome integrity and correct integration of target sequences is assessed using PCR-based assays as described above. The DG44 engineering cell line is cultured in the presence of doxycycline to ensure expression of Tsix during the final engineering step, i.e., loading of the retrofitted BAC.

Transfer to iPSCs and Downstream Assays

All experiments testing the efficacy of the Tsix-Xist approach for silencing gene expression on the ACE are performed as described above. In this series of experiments, Tsix expression levels are tested using Taqman assays to ensure that expression correlates with expected phenotypes, e.g., high Tsix expression correlates with absent Xist expression and vice versa.

Additional Studies

Additional experiments test whether the whole chromosome kill switch is reversible upon changing culture conditions, e.g., whether addition of doxycycline to the culture medium of cells and the subsequent silencing of Xist results in reactivation of DsRed-DR expression. In addition, testing whether silencing is maintained when iPSCs are differentiated into different lineages is performed, and further whether this state is reversible in differentiated cells derived from iPSCs. In addition, the entire X chromosome inactivation center (>1 Mbp in size) is loaded onto the synthetic chromosome as a series of overlapping, engineered BACs. To create a kill switch that would preferentially leads to inactivation as cells differentiate, the engineered Xic has a deletion of Tsix, leading to skewed inactivation of the engineered chromosome.

The preceding merely illustrates the principles of the invention. It will be appreciated that those skilled in the art will be able to devise various arrangements which, although not explicitly described or shown herein, embody the principles of the invention and are included within its spirit and scope. Furthermore, all examples and conditional language recited herein are principally intended to aid the reader in understanding the principles of the invention and the concepts contributed by the inventors to furthering the art, and are to be construed as being without limitation to such specifically recited examples and conditions. Moreover, all statements herein reciting principles, aspects, and embodiments of the invention as well as specific examples thereof, are intended to encompass both structural and functional equivalents thereof. Additionally, it is intended that such equivalents include both currently known equivalents and equivalents developed in the future, i.e., any elements developed that perform the same function, regardless of structure. The scope of the present invention, therefore, is not intended to be limited to the exemplary embodiments shown and described herein. Rather, the scope and spirit of present invention is embodied by the appended claims. In the claims that follow, unless the term "means" is used, none of the features or elements recited therein should be construed as means-plus-function limitations pursuant to 35 U.S.C. § 112, 16. All references cited herein are hereby incorporated by reference into the detailed description for all purposes.

We claim:

1. An autonomously-replicating, non-integrating, stable mammalian synthetic chromosome comprising:
    multiple copies of a site-specific unidirectional recombination site;
    an active mammalian centromere comprising amplified ribosomal DNA (rDNA);
    a regulatable expression cassette comprising a mammalian X inactivation center (Xic) encoding at least an X-inactive specific transcript (Xist) and product(s) from at least one gene of interest; and
    a first regulatable promoter controlling expression of Xist;
    wherein expression of Xist acts as a whole chromosome inactivation switch that controls silencing of the synthetic chromosome.

2. The synthetic chromosome of claim 1, comprising an entire Xic region from an X chromosome.

3. The synthetic chromosome of claim 1, further comprising a Tsix gene under control of a second regulatable promoter.

4. The synthetic chromosome of claim 1, comprising at least two genes of interest.

5. The synthetic chromosome of claim 4, comprising at least ten genes of interest.

6. The synthetic chromosome of claim 5, comprising at least twenty genes of interest.

7. The synthetic chromosome of claim 6, comprising at least 25 genes of interest.

8. The synthetic chromosome of claim 1, wherein the synthetic chromosome comprises human centromere sequences.

9. A human cell comprising the synthetic chromosome of claim 8.

10. A mammalian cell comprising the synthetic chromosome of claim 1.

11. An autonomously-replicating, non-integrating, stable mammalian synthetic chromosome comprising:
    multiple copies of a site-specific unidirectional recombination site;
    at least one gene of interest;
    an active mammalian centromere comprising amplified ribosomal DNA (rDNA);
    a regulatable promoter; and
    operably linked to said promoter, a mammalian X inactivation center (Xic) encoding gene products necessary and sufficient for initiation of inactivation, thereby allowing reversibly regulatable silencing of expression from the synthetic chromosome.

* * * * *